(12) United States Patent
Janzen et al.

(10) Patent No.: US 11,762,811 B2
(45) Date of Patent: Sep. 19, 2023

(54) COMPUTATION MODULE CONFIGURED TO ESTIMATE RESOURCE FOR TARGET POINT FROM KNOWN RESOURCES OF DOTS NEAR THE TARGET POINT

(71) Applicant: Avalara, Inc., Seattle, WA (US)

(72) Inventors: Mark Janzen, Seattle, WA (US); Aaron Lee Robles, Bainbridge Island, WA (US); Nikki Nash, Seattle, WA (US); Rahul Aggarwal, Maharashtra (IN); Gregory T. Kavounas, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 35 days.

(21) Appl. No.: 17/402,258

(22) Filed: Aug. 13, 2021

(65) Prior Publication Data

US 2022/0391350 A1     Dec. 8, 2022

(30) Foreign Application Priority Data

Jun. 3, 2021 (IN) .............................. 202141024702

(51) Int. Cl.
    *G06F 16/14*       (2019.01)
    *G06Q 40/10*       (2023.01)
    *H04L 67/10*       (2022.01)

(52) U.S. Cl.
    CPC ........... *G06F 16/148* (2019.01); *G06Q 40/10* (2013.01); *H04L 67/10* (2013.01)

(58) Field of Classification Search
    CPC ...... G06F 16/148; G06Q 40/10; G06Q 30/04; G06Q 40/123; H04L 67/10

(Continued)

(56) References Cited

U.S. PATENT DOCUMENTS 5,414,621 A * 5/1995 Hough ............... G06Q 30/0205
                                                       705/7.34
5,857,174 A * 1/1999 Dugan .................. G06Q 50/16
                                                        705/313

(Continued)

FOREIGN PATENT DOCUMENTS

| CN | 106708659 A | * | 5/2017 | .......... G06F 11/1402 |
| DE | 112018005149 T5 | * | 9/2020 | ........... G06T 17/005 |

(Continued)

OTHER PUBLICATIONS

"PCT Search Report and Written Opinion, PCT/US2022/031791", dated Aug. 25, 2022, 15 pages.

*Primary Examiner* — Phuong Thao Cao
(74) *Attorney, Agent, or Firm* — VLP Law Group

(57) ABSTRACT

Systems and methods electronically generate sample dots, produce resources associated with the dots and estimate a resource for a target point from known resources of dots near the target point based on client side version of digital rules, cataloged data and coarse values previously received from the online service platform. A client receives cataloged data of a cataloged domain in which the cataloged data includes data representing a plurality of dots and a respective computed resource value for each of the dots and each dot of the plurality of dots represents a point in the cataloged domain. In response to confirming a target point is in the cataloged domain, the system discovers a closest one or more dots to the target point based on the cataloged data, estimates a statistic for a resource for the target point based on the respective computed resource values of the closest one or more dots, stores the estimated statistic in a memory, and produces the local estimate based on the estimated statistic.

6 Claims, 14 Drawing Sheets

(58) Field of Classification Search
USPC .......................................................... 707/769
See application file for complete search history.

(56) References Cited

U.S. PATENT DOCUMENTS

| | | | | |
|---|---|---|---|---|
| 6,115,694 | A * | 9/2000 | Cheetham | G06Q 30/06 |
| | | | | 705/7.35 |
| 6,178,406 | B1 * | 1/2001 | Cheetham | G06Q 30/06 |
| | | | | 705/7.34 |
| 7,542,852 | B1 * | 6/2009 | Rose | G01W 1/10 |
| | | | | 73/170.16 |
| 7,783,536 | B2 | 8/2010 | William et al. | |
| 7,933,803 | B1 | 4/2011 | Nadler et al. | |
| 8,005,684 | B1 * | 8/2011 | Cheng | G06Q 30/0278 |
| | | | | 708/134 |
| 8,620,578 | B1 | 12/2013 | Brown et al. | |
| 8,725,407 | B2 | 5/2014 | Hurley et al. | |
| 9,760,915 | B2 | 9/2017 | Pavlou et al. | |
| 10,387,788 | B2 * | 8/2019 | Zhu | G06N 7/005 |
| 10,445,818 | B1 | 10/2019 | Chowdhary | |
| 10,769,611 | B2 | 9/2020 | McNeel | |
| 11,373,257 | B1 * | 6/2022 | Guo | G06Q 50/16 |
| 11,409,756 | B1 * | 8/2022 | Park | G06F 16/254 |
| 2001/0039506 | A1 * | 11/2001 | Robbins | G06Q 10/06 |
| | | | | 705/7.41 |
| 2002/0138765 | A1 | 9/2002 | Fishman et al. | |
| 2004/0225664 | A1 * | 11/2004 | Casement | G06F 16/25 |
| 2007/0136158 | A1 | 6/2007 | Rawlings et al. | |
| 2007/0136159 | A1 | 6/2007 | Rawlings et al. | |
| 2010/0103292 | A1 * | 4/2010 | Xiong | H04N 5/367 |
| | | | | 348/246 |
| 2013/0013471 | A1 | 1/2013 | Fishman | |
| 2013/0036037 | A1 * | 2/2013 | Meredith | G06Q 40/00 |
| | | | | 705/35 |
| 2013/0151439 | A1 * | 6/2013 | Galaska | G06Q 40/00 |
| | | | | 705/36 T |
| 2013/0294687 | A1 * | 11/2013 | Fujimiya | H04N 9/04557 |
| | | | | 382/165 |

FOREIGN PATENT DOCUMENTS

| | | | | |
|---|---|---|---|---|
| KR | 20200005262 | A * | 1/2020 | ........... G06T 17/005 |
| WO | 2020251653 | A1 | 12/2020 | |

* cited by examiner

COMPUTATION MODULE CONFIGURED TO ESTIMATE RESOURCE FOR TARGET POINT FROM KNOWN RESOURCES OF DOTS NEAR THE TARGET POINT

TECHNICAL FIELD

The technical field relates to computer networks, and particularly to networked automated systems for estimating resources.

BRIEF SUMMARY

The present description gives instances of computer systems, devices and storage media that may store programs and methods. Embodiments of the system may produce a local estimate of less-than-critical resources based on a client side version of digital rules, cataloged data and coarse values received from an online service platform. In particular, the system generates sample dots, produces resources associated with the dots and estimates a resource for a target point from known resources of dots near the target point based on the client side version of digital rules, cataloged data and coarse values previously received from the online service platform. Although using the client side version of digital rules, cataloged data and coarse values may not include all the parameters and values needed to provide a fully accurate estimate of the resource, the ability to locally estimate resources without having to make network calls to the online service platform provides a faster and more efficient way of obtaining a potentially useful estimate of resources. For example, this functionality to locally estimate resources may provide a faster and more efficient way of obtaining a potentially useful estimate of resources when there are unfavorable conditions or latency of the network, imminent overloading of the online service platform or other operating conditions or demands on the online service platform preventing it from producing a timely more accurate estimate.

In addition, providing the coarse values and cataloged data instead of a set of values that includes all the parameters and values needed to provide a fully accurate estimate of the resource reduces the data package size that needs to be distributed to clients, thus making it more efficiently and easily deployable to the client computer systems. This also reduces internet traffic and it can be critical when the internet is down or slow, and the results of the computations are needed in real time.

Therefore, the systems and methods described herein for generating sample dots, producing resources associated with the dots and estimating a resource for a target point from known resources of dots near the target point improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to facilitate estimation of resources.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
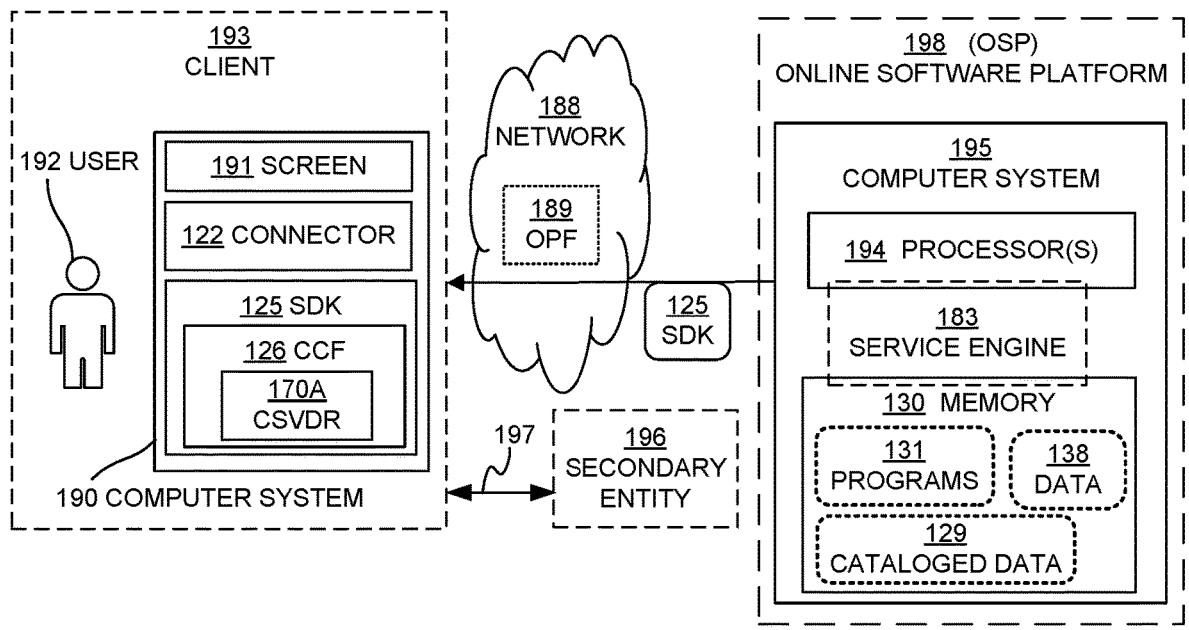
FIG. 1 is a diagram showing sample aspects of embodiments of the present disclosure involving a client receiving a software development kit (SDK) including client-side versions of digital rules (CSVDR) that is an improvement in automated computerized systems.

FIG. 1 is a diagram showing sample aspects of embodiments of the present disclosure involving a client receiving a software development kit (SDK) including client-side versions of digital rules (CSVDR) that is an improvement in automated computerized systems.

A sample computer system 195 according to embodiments is shown. The computer system 195 has one or more processors 194 and a memory 130. The memory 130 stores programs 131, cataloged data 129 and other data 138. The one or more processors 194 and the memory 130 of the computer system 195 thus implement a service engine 183. One or more of the components of the computer system 195 may also be present in client computer system 190 of client 193 for performing the operations and implementing the functionality of computer system 190 described herein.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be, but are not limited to: generation and delivery of a software development kit (SDK) 125 for the client 193 to perform local estimates of resources; generation and delivery of a coarse values file (CVF) and cataloged data 129 for the client 193 to perform local estimates of resources, searches, determinations, computations, verifications, notifications, the transmission of specialized information (including digital rules for estimating resources and data that effectuates payments, or remits resources); identifying a domain; selecting a plurality of dots within the domain, in which each dot of the plurality of dots represents a point spatially within the domain; accessing digital rules regarding computing resources for the domain; for each dot of the plurality of dots, producing a respective resource based on the digital rules; cataloging the domain by at least generating a map of dots located spatially within the domain based on respective positions of each dot of the plurality of dots relative to each other within the domain; performing either removing dots and respective resources from the map or adding additional dots and respective resources to the map resulting in a non-uniform spatial density of dots on the map; transmitting cataloged data of the cataloged domain to the client 193, thereby enabling the client 193 to produce a local estimate of a resource for a dataset that represents a relationship instance of the client entity with another entity; and so on, including what is described in this document. For example, in various embodiments, the service engine 183 of the OSP 193 is configured to generate sample dots and produce resources associated with the dots. Such services can be provided as a Software as a Service (SaaS). The SDK 125 may be a collection of software development tools in one package installable by the client computer system 190. The SDK 125 may facilitate the creation of applications, such as the CCF 126 by having a compiler, debugger and a software framework. The SDK 125 may include libraries, documentation, code samples, processes, and guides that the client 193 can use and integrate with the connector 122 and other applications of the computer system 190 to facilitate the computer system 190 performing local estimates of resources. For example, in various embodiments, CCF 126 is or includes a computation module to estimate resources for a target point from known resources of dots near the target point.

A user 192 may be standalone. The user 192 may use a computer system 190 that has a screen 191, on which user interfaces (UIs) may be shown. In embodiments, the user 192 and the computer system 190 are considered part of a client 193, which can be referred to also merely as an entity. In such instances, the user 192 can be an agent of the client 193, and even within a physical site of the client 193, although that is not necessary. In embodiments, the computer system 190 or other device of the user 192 or the client 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode (ATM) systems, frame relay systems, digital subscriber line (DSL) systems, cable and/or satellite systems, radio frequency (RF) systems, telephone systems, cellular systems, other wireless systems, and the Internet. In various embodiments the communication network 188 can be or include any type of network, such as a local area network (LAN), a metropolitan area network (MAN), a wide area network (WAN), or the Internet.

Downloading or uploading may be permitted from one of these two computer systems to the other, and so on. Such accessing can be performed, for instance, with manually uploading files, like spreadsheet files, etc. Such accessing can also be performed automatically. The computer system 190 and the computer system 195 may exchange requests and responses with each other. Such can be implemented with a number of architectures.

In one such architecture, a device remote to the service engine 183, such as computer system 190, may have a certain application, such as a client computing facility (CCF) 126 and an associated connector 122 that is integrated with, sits on top of, or otherwise works with that certain application. The connector 122 may be able to fetch from a remote device, such as the computer system 195, the details required for the service desired from the OSP 198. The computer system 190 may receive, via network 188, an SDK 125 from the OSP 198 that includes the CCF 126 and/or the connector 122. The OSP 198 may prepare and send the CCF 126 as part of the SDK 125 automatically or in response to a request from the client computer system 190. In requesting services from the OSP 198, the client computer system 190 may form an object or payload, and then send or push a request that carries the payload to the service engine 183 via a service call. The service engine 183 may receive the request with the payload. The service engine 183 may then apply digital rules to the payload to determine a requested resource, including producing an estimate of a resource, form a payload that is an aspect of the resource (e.g., that includes the estimate) and then push, send, or otherwise cause to be transmitted a response that carries the payload to the connector 122. The connector reads the response, and forwards the payload to the certain application, such as the CCF 126.

In some embodiments, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. In some embodiments, this architecture enables the client 193 to directly consume a REST API from their particular application (e.g., CCF 126), without using a connector 122. The particular application of the remote device may be able to fetch internally from the remote device the details required for the service desired from the OSP 198, and thus send or push the request to the REST API. In turn, the REST API talks in background to the service engine 183. Again, the service engine 183 determines the requested resource (which may be an estimate if the resource) and sends an aspect of it back to the REST API. In turn, the REST API sends the response that has the payload to the particular application (e.g., CCF 126).

As one example service the OSP 198 may provide to the client 193, the service engine 183 of the OSP may use digital rules to estimate resources for the client 193. However, the CCF 126 includes CSVDR 170 that may instead, or additionally, be used by the CCF 126 of the client computer system 190 to produce local estimates of the same resources, but with the advantage of not having to make network calls via network 188. These CSVDR 170 can be full versions of the digital rules used by the OSP 198 or less than full versions. For example, the CSVDR 170 of the CCF 126 may include local digital rules that can produce resource estimates in a less refined way than the online digital rules of the OSP 198. In many instances, the estimates produced by the OSP 198 using the digital rules of the OSP 198 may be more accurate than those produced locally by the CCF 126 of client computer system 190 using the CSVDR 170. In some embodiments, but not always, the CSVDR 170 are a subset of the online digital rules of the OSP 198.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, any devices of the OPF 189 can be considered to be remote devices, from the perspective of the computer system 195 and/or client computer system 190.

In some instances, the user 192 or the client 193 may have instances of relationships with secondary entities. Only one such secondary entity 196 is shown. However, additional secondary entities may be present in various other embodiments. In this example, the client 193 has a relationship instance 197 with the secondary entity 196. In some embodiments, the secondary entity may also communicate with the client 193 via network 188.

In some instances, the user 192, the client 193 and/or one or more intermediary entities (not shown) may have data about one or more secondary entities, such as secondary entity 196, for example via relationship instances of the user 192 or client 193 with the secondary entity 196. The client 193 and/or the secondary entity 196 may be referred to as simply entities. One of these entities may have one or more attributes. Such an attribute of such an entity may be any one of its name, type of entity, a physical or geographical location such as an address, a contact information, an affiliation, a characterization of another entity, a characterization by another entity, an association or relationship with another entity (general or specific instances), an asset of the entity, a declaration by or on behalf of the entity, and so on.

Figure 12:
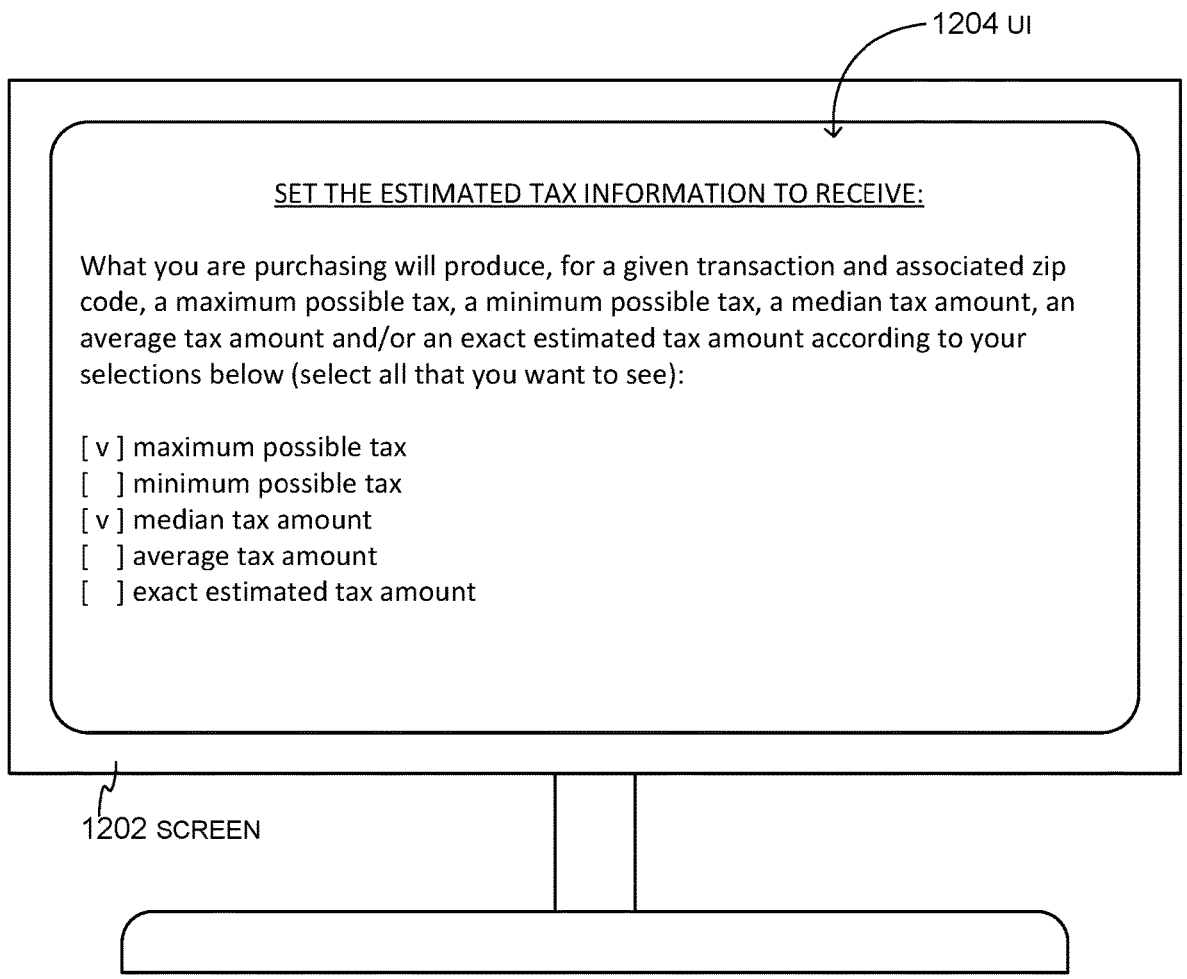
FIG. 12 is a sample view of a User Interface (UI) of a system for estimating resources that provides a selectable option to produce a local estimate of a tax amount based on a selection from a range of possible techniques to estimate the tax amount for a given transaction and associated zip code that is an improvement in automated computerized systems, according to embodiments of the present disclosure.
Figure 14:
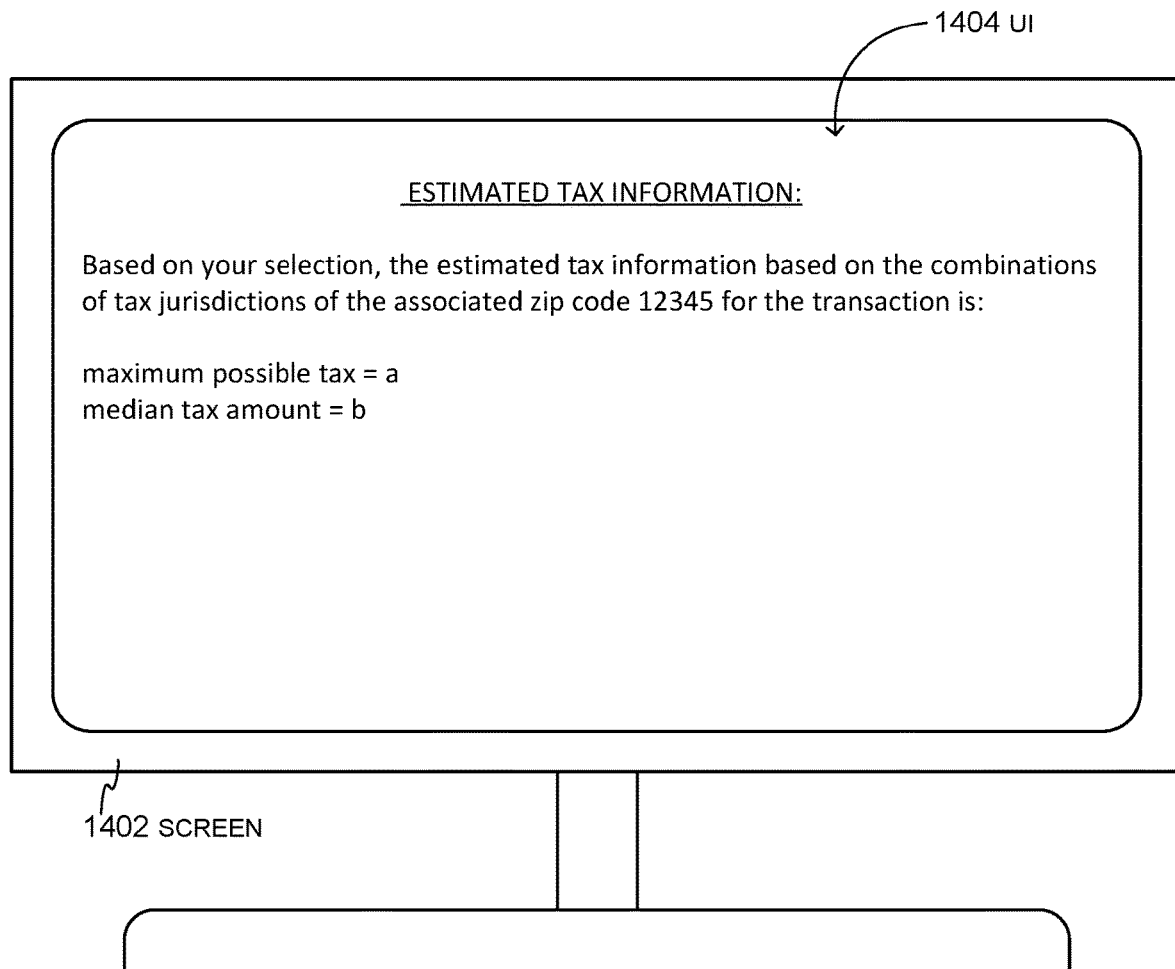
FIG. 14 is a sample view of a User Interface (UI) of a system for estimating resources that provides output including local estimates of a tax amount for a given transaction and associated zip code based on the selection made via the UI of FIG. 12 that is an improvement in automated computerized systems, according to embodiments of the present disclosure.

In some embodiments, the CCF 126 may present a graphical user interface for estimating resources that provides a selectable option to produce a local estimate of a resource based on a selection from a range of possible techniques using the CSVDR 170 to estimate the resource for various relationship instances and respective location information associated with each of the relationship instances. Examples of such user interfaces are shown in FIG. 12 and FIG. 14.

Figure 2:
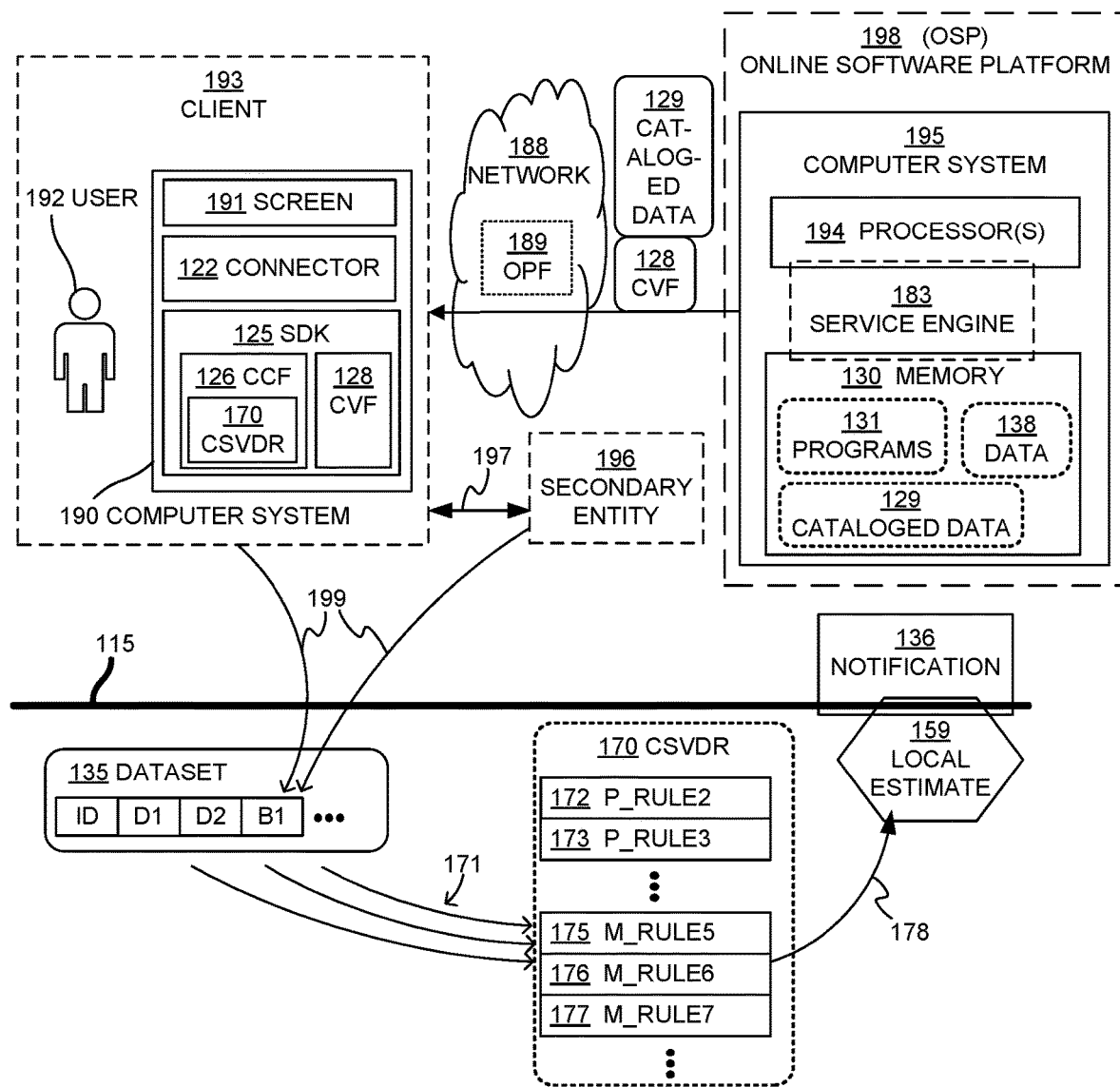
FIG. 2 is a diagram showing sample aspects of embodiments of the present disclosure involving producing and outputting a local estimate of a resource for a dataset by the CSVDR, cataloged data and values of a coarse values file (CVF) received by the client of FIG. 1, which is an improvement in automated computerized systems.

FIG. 2 is a diagram showing sample aspects of embodiments of the present disclosure involving producing and outputting a local estimate (LE) of a resource for a dataset by the CSVDR, cataloged data 129 and values of a coarse values file (CVF) 128 received by the client of FIG. 1, which is an improvement in automated computerized systems.

A thick line 115 separates this diagram, although not completely or rigorously, into a top portion and a bottom portion. Above the line 115 the emphasis is mostly on entities, components, their relationships, and their interactions, while below the line 115 emphasis is mostly processing of data that takes place often within one or more of the components above the line 115.

Above the line 115, the sample computer system 195, network 188, client computer system 190 and secondary entity 196 according to embodiments is shown. In embodiments, the computer system 190 generates one or more datasets. A sample generated dataset 135 is shown below the line 115. The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196. (It should be noted that the arrows 199 describe a correspondence, but not the journey of data in becoming the dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, a location associated with a relationship instance represented by the dataset 135, and/or an indication of an identity or other characteristic of the client 193 and/or the secondary entity 196. The dataset 135 may further have additional such values, as indicated by the horizontal dot-dot-dot to the right of the dataset 135. In some embodiments, the dataset 135 has values that characterize attributes of each of the client 193 and the secondary entity 196, but that is not required.

The CVF 128 has simple data for use by the CSVDR 170 in producing the local LE 159. The data of the CVF 128 might not be necessarily accurate, because it might not cover all the parameters that are needed by all the CSVDR 170 to produce a more accurate estimate. For example, the CVF 128 can indicate rates according to particular domains, plus one or more special variables. Also, the client 193 receives from the computer system 195 of the OSP 198 cataloged data 129 of a cataloged domain stored in memory 130 (e.g., of a geographic area associated with the dataset 135). In various embodiments, the cataloged data 129 includes data representing a plurality of dots and a respective computed resource value for each of the dots. Each dot of the plurality of dots represents a point (e.g., a geographical location) in the cataloged domain. For example, a respective computed resource value may have been previously computed by the OSP 198 and/or the client 193 for each of the dots in the cataloged data 129. In some embodiments, the CVF 128 includes some or all of the cataloged data 129. The CCF 126 of the computer system 190 may identify a target point from the dataset 135 and confirm the target point is in the cataloged domain. In response to confirming the target point is in the cataloged domain, the CCF 126 may discover a closest one or more dots to the target point based on the cataloged data 129. The CCF 126 may then estimate a statistic for a resource for the target point based on the respective computed resource values of the closest one or more dots. The CCF 126 may then store the estimated statistic in a memory and then produce the local estimate 159 based on the estimated statistic. The CCF 126 may then output the local estimate 159 to a local output device (e.g., screen 191) in conjunction with the dataset 135.

Still, this may not be completely accurate in some instances as it would only provide approximate estimates because it does not discuss or consult other parameters that are needed to produce more accurate estimates. In embodiments, the CVF 128 is distributed via network 188 to special subscribers or clients of the OSP 198, which may include client 193. Subscribers, such as client 193, could be ecommerce platforms, high-volume direct customers of application programming interface (API) calls for accurate resource computation, accurate resource estimation, etc. In embodiments, the CVF 128 to be distributed is updated by the computer system 195 of the OSP 198 as new and updated content becomes digested. In various, embodiments, the CVF 128 and cataloged data 129 may be transmitted from the OSP 198 via network 188 in response to a request form the client computer system 190, pushed periodically from the OSP 198 to the client computer system 190 and/or as new and updated content becomes digested by the OSP 198. The OSP 198 may distribute the CVF 128 and cataloged data 129 in a number of ways, including, but not limited to, leveraging a function of the SDK 125 or calling a CVF subscription API of the service engine 183 directly.

In embodiments, stored CSVDR 170 may be included in the CCF 126 and accessed by the computer system 190. The CSVDR 170 are digital in that they are implemented for use by software. For example, the CSVDR 170 may be implemented within CCF 126. The CCF 126 may access the CSVDR 170 and CVF 128 responsive to generating a dataset, such as the dataset 135. The CSVDR 170 may include main rules, which can thus be accessed by the computer system 190. In this example, three sample digital main rules are shown explicitly, namely M_RULE5 175, M_RULE6 176, and M_RULE7 177. In this example, the CSVDR 170 also include digital precedence rules P RULE2 172 and P RULE3 173, which can thus be further accessed by the computer system 190. The CSVDR 170 may include additional rules and types of rules, as suggested by the vertical dot-dot-dots.

In embodiments, a certain one of the digital main rules may be identified from among the accessed stored CSVDR 170 by the computer system 190. In particular, values of the dataset 135 can be tested, according to arrows 171, against logical conditions of the digital main rules. In this example, the certain main rule M_RULE6 176 is thus identified, which is indicated also by the beginning of an arrow 178. Identifying may be performed in a number of ways, and depending on how the digital main rules are implemented.

A number of examples are possible for how to recognize that a certain condition of a certain digital rule is met by at least one of the values of the dataset 135. For instance, the certain condition could indicate a domain defined by boundary of a region that is within a space. In various embodiments, a domain may be a region defined by a boundary as discussed above or may be an entity representing or otherwise associated with the region. The region could be geometric, and be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the client 193, and the one or more values of the dataset 135 that characterize the location could be one or more numbers or an address, or longitude and latitude. The condition can be met depending on how the one or more values compare with the boundary and/or with geographical locations represented by the plurality of dots in the cataloged domain. For example, the comparison may reveal that the location is in the region instead of outside the region and/or the location represented by a target point from the dataset 135 is within a certain threshold distance from one or more locations each represented by respective ones of the plurality of dots. The comparison can be made by rendering the characterized attribute in units comparable to those of the boundary and/or locations represented by the plurality of dots. For example, the characterized attribute could be an address that is rendered into longitude and latitude coordinates, and so on. In other instances, instead of rendering the characterized attribute in units comparable to those of the boundary, the CCF 126 may instead consult a more coarse value in the CVF 128 and/or cataloged data 129, which maps an aspect of the address, such as zip code, to a parameter value associated with the zip code, such as rate to use in calculating the local estimate. In various embodiments, the mapping is based on applying the CSVDR 170 to the computed resource values indicated in the cataloged data 129 that have been previously computed by the OSP 198 and/or the client 193 for each of the dots in the cataloged data 129 representing geographic locations within the zip code.

Where more than one of the digital main rules are found that could be applied, there are additional possibilities. For instance, the computer system 190 of FIG. 1 may further access at least one stored digital precedence rule, such as P RULE2 172 or P RULE3 173. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied. However, when limited data is available or used, such as when the CCF 126 is using the CVF 128 and cataloged data 129, the digital precedence rule may not be fully applied, such that only one of the digital main rules may be applied. Equivalent embodiments are also possible, where digital precedence rules are applied first to limit an iterative search, so as to test the applicability of fewer than all the rules according to arrows 171.

In embodiments, an estimated resource may be produced for the dataset 135, by the computer system 190 locally applying the certain consequent of the certain digital main rule. The resource can be a computational result, a document, an item of value, a representation of an item of value, etc., made, created or prepared for the user 192, the client 193, the secondary entity 196, etc., on the basis of the attribute. As such, in some embodiments, the estimated resource is produced by a determination and/or a computation. In the example of FIG. 2, an estimated resource may be produced locally by the CCF 126 for the dataset 135, which is referred to as local estimate (LE) 159. This may be performed by the CCF 126 of computer system 190 locally applying the certain M_RULE6 176, as indicated by the arrow 178.

The local estimate may be produced in a number of ways. For example, the certain consequent can be applied to one of the values of the dataset 135 based on the CVF 128 and/or cataloged data 129. For instance, one of the values of the dataset 135 can be a numerical base value, e.g., B1, that encodes an aspect of the dataset 135, as mentioned above. In such cases, applying a certain consequent of M_RULE6 176 may include performing a mathematical operation on the base value B1. For example, applying the certain consequent may include multiplying the base value B1 with a number found in the CVF 128 and/or cataloged data 129 indicated by the certain consequent. Such a number can be, for example, a percentage, e.g., 1.5%, 3%, 5%, and so on. Such a number can be indicated directly by the certain rule, or be stored in a place indicated by the certain rule, such as in the CVF 128, and so on.

As mentioned above, in some embodiments two or more digital main rules may be applied. For instance, the computer system 195 may recognize that an additional condition of an additional one of the accessed CSVDR 170 is met by at least one of the values of the dataset 135. In this example there would be no digital precedence rules, or the available digital precedence rules would not preclude both the certain digital main rule and the additional digital main rule from being applied concurrently. Such an additional digital main rule would have an additional consequent.

In such embodiments, the LE 159 may be produced by the CCF 126 of the computer system 190 applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the LE 159 may be produced by summing the first product and the second product, by averaging the first product and the second product, or by performing some other computation involving the first product and the second product. However, in some embodiments, when utilizing limited data, such as the CVF 128 and/or cataloged data 129, the second number may not be available in the CVF 128 and/or cataloged data 129, and thus the local estimate may be calculated instead based solely on the first number stored in the CVF 128 and/or cataloged data 129, and thus produce a less accurate estimate than if the second number indicated by the additional consequent was also used.

In embodiments, a notification 136 can be caused to be presented on the screen 191, by the computer system 190. The notification 136 can include the LE 159 and/or be about an aspect of the LE 159. In the example of FIG. 2, a notification 136 can be caused to be transmitted by the computer system 195, for example as an answer or other response to the received dataset 135. The notification 136 can be about an aspect of the LE 159. In particular, the notification 136 may inform about the aspect of the LE 159, namely that it has been determined, where it can be found, what it is, or at least a portion or a statistic of its content, a rounded version of it, and so on. Of course, the planning should be that the recipient of the notification 136 understands what it is being provided.

The notification 136 can be transmitted to one of an output device and another device. The output device may be the screen of a local user, such as screen 191, or a remote user. The notification 136 may thus cause a desired image, message, or other such notification to appear on the screen, such as within a Graphical User Interface (GUI) and so on. The other device can be the remote device, from which the dataset 135 was received.

Figure 3:
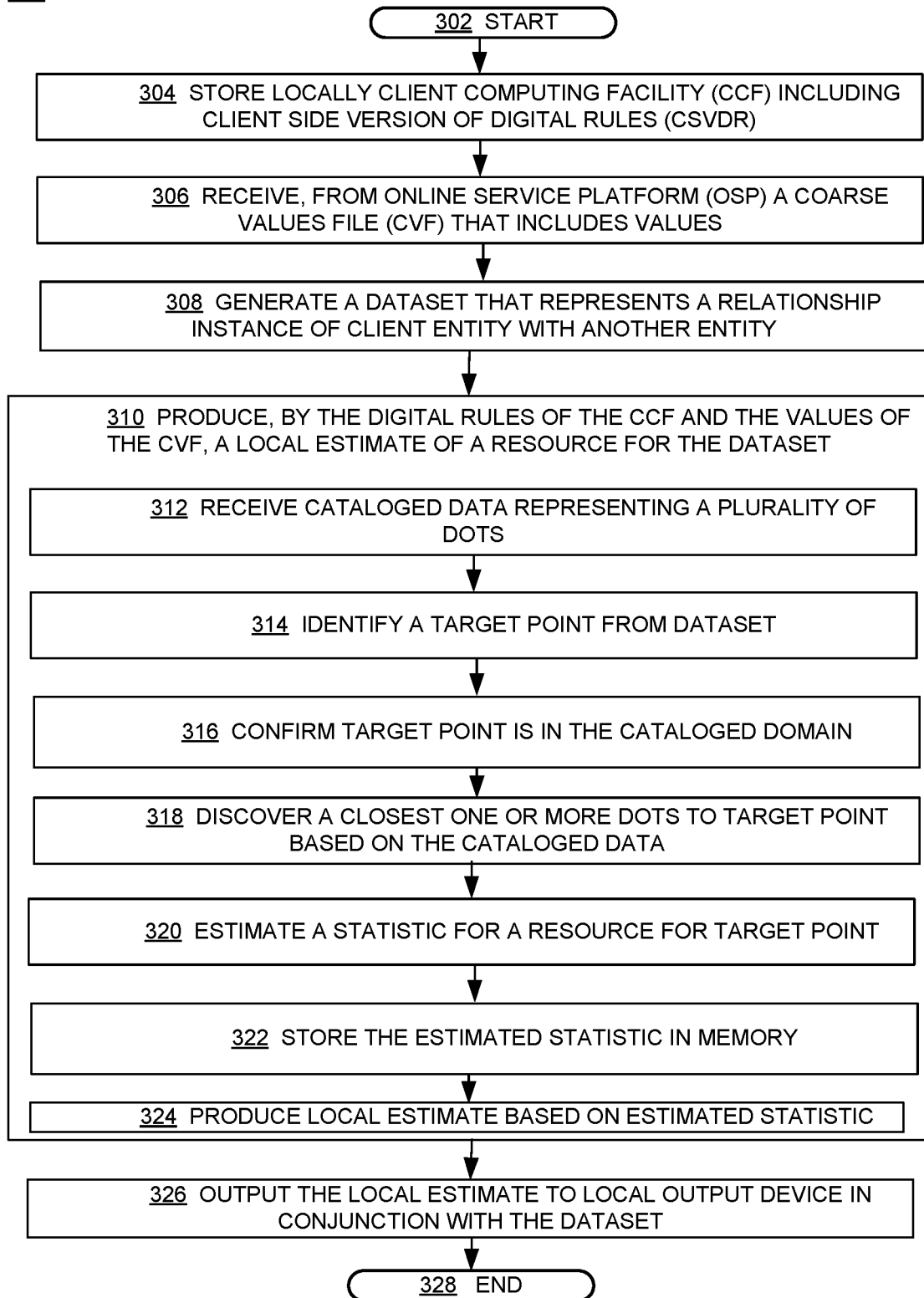
FIG. 3 is a flowchart for illustrating a sample method for producing a local estimate of a resource using cataloged data that is an improvement in automated computerized systems, according to embodiments of the present disclosure.

FIG. 3 is a flowchart for illustrating a sample method 300 for producing a local estimate of a resource using cataloged data that is an improvement in automated computerized systems, according to embodiments of the present disclosure.

The method 300 starts at 302.

At 304, the computer system 190 of client 193 stores locally on a storage medium a client computing facility (CCF) that includes digital rules.

At 306, the computer system 190 receives from the OSP 198 across a network 188, a coarse values file (CVF) that includes values.

At 308, the computer system 190 generates a dataset that represents a relationship instance of the client entity with another entity.

At 310, the computer system 190 produces, by the digital rules of the CCF and the values of the CVF, a local estimate of a resource for the dataset. The producing the local estimate may include one or more of actions 312 through 324.

At 312, the computer system 190 receives cataloged data of a cataloged domain. The cataloged data includes data representing a plurality of dots and a respective computed resource value for each of the dots, in which each dot of the plurality of dots represents a point in the cataloged domain. The domain may be a geographical area and each dot of the plurality of dots represents a location within the geographical area. In some embodiments, the CVF includes the cataloged data.

At 314, the computer system 190 identifies a target point from the dataset. A location of the target point may be defined within the domain by coordinates.

At 316, the computer system 190 confirms the target point is in the cataloged domain.

At 318, the computer system 190, in response to confirming the target point is in the cataloged domain, discovers a closest one or more dots to the target point based on the cataloged data.

At 320, the computer system 190 estimates a statistic for a resource for the target point based on the respective computed resource values of the closest one or more dots.

At 322, the computer system 190 stores the estimated statistic in a memory. In some embodiments, the estimated statistic is a single estimated resource value.

At 324, the computer system 190 produces the local estimate based on the estimated statistic. In some embodiments, the estimated statistic includes a maximum resource value and a minimum resource value of the respective computed resource values of the closest one or more dots. The producing of the local estimate may include receiving input indicating a selection of what percent of the maximum resource value and what percent of the minimum resource value to use in producing the local estimate. The computer system 190 may produce the local estimate based on the selection.

At 326, the computer system 190 outputs the local estimate to the local output device in conjunction with the dataset.

The method 300 ends at 328.

Figure 4:
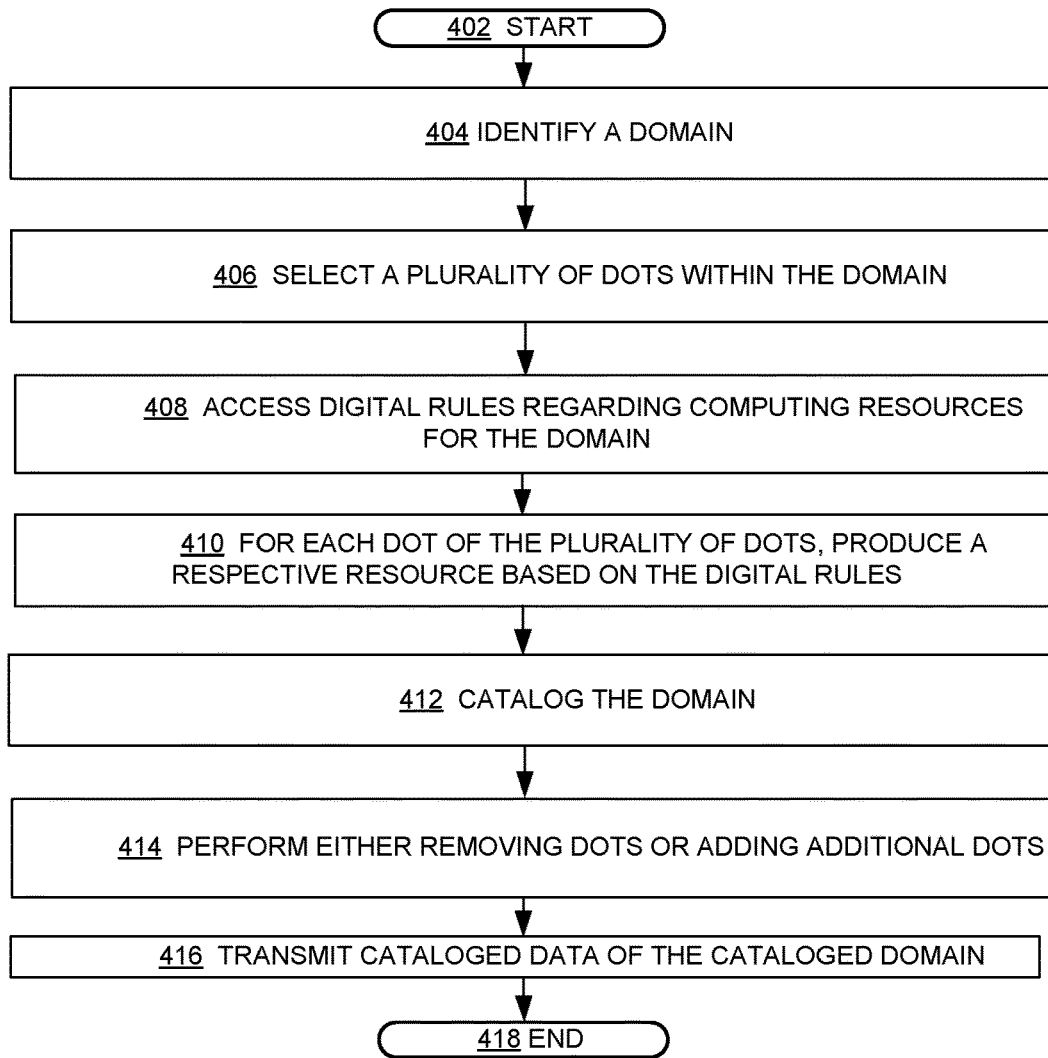
FIG. 4 is a flowchart for illustrating a sample method for cataloging data and transmitting the cataloged data that is an improvement in automated computerized systems, according to embodiments of the present disclosure.

FIG. 4 is a flowchart for illustrating a sample method 400 for cataloging data and transmitting the cataloged data that is an improvement in automated computerized systems, according to embodiments of the present disclosure.

The method 400 starts at 402.

At 404, the computer system 195 of the online service platform (OSP) 198 identifies a domain.

At 406, the computer system 195 selects a plurality of dots within the domain, in which each dot of the plurality of dots represents a point spatially within the domain.

At 408, the computer system 195 accesses digital rules regarding computing resources for the domain.

At 410, the computer system 195, for each dot of the plurality of dots, produces a respective resource based on the digital rules.

At 412, the computer system 195 catalogs the domain by at least generating a map of dots located spatially within the domain based on respective positions of each dot of the plurality of dots relative to each other within the domain.

At 414, the computer system 195 performs either removing dots and respective resources from the map or adding additional dots and respective resources to the map resulting in a non-uniform spatial density of dots on the map. For example, the computer system 195 may remove dots by at least removing one or more dots from the map that are surrounded on the map by other dots that have a same respective resource value as the one or more dots.

As another example, the computer system 195 may identify dots on the map that are adjacent to each other, but have different respective resource values and then add dots and respective resource values on the map in between the identified dots. For instance, the computer system 195 may repeat the identifying dots as above and the adding dots until a spacing between dots on the map is smaller than a threshold. The computer system 195 may produce and store, as part of cataloged data of the cataloged domain, a respective resource for each of the added dots based on digital rules stored or otherwise accessible by the computer system 195.

At 416, the computer system 195 transmits cataloged data of the cataloged domain to a computer system 190 of the client 193. This enables the computer system 190 of the client 193 to produce a local estimate of a resource for a dataset that represents a relationship instance of the client 193 with another entity, such as secondary entity 196.

The method 400 ends at 418.

Figure 5:
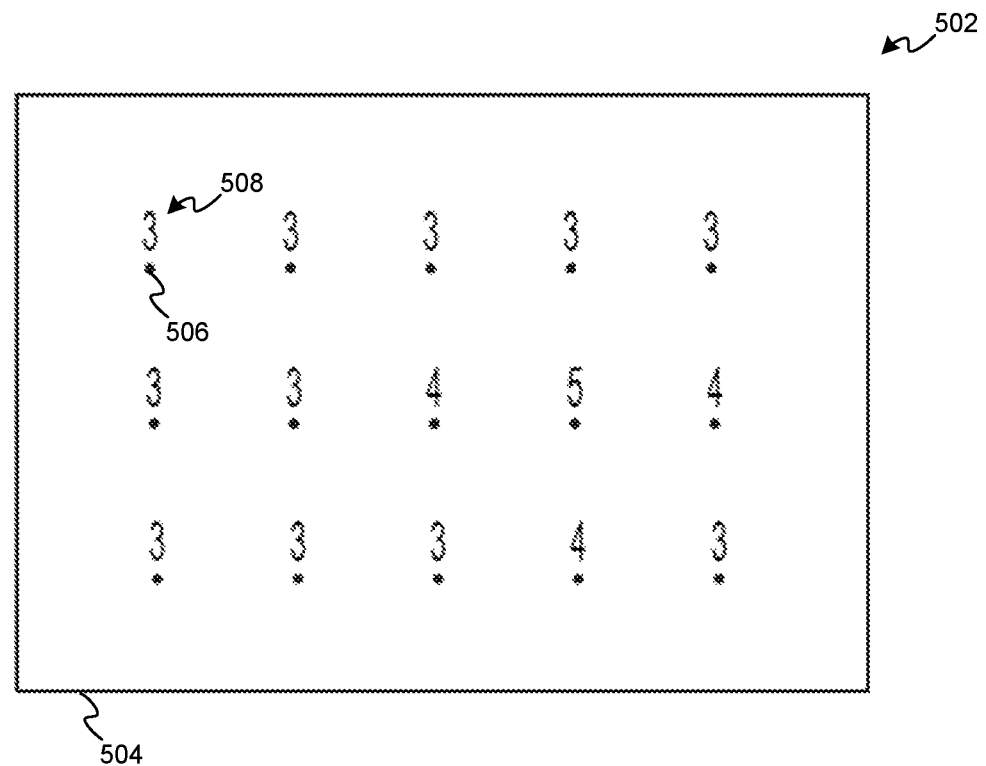
FIG. 5 is a diagram illustrating cataloged dots and their associated produced resources resulting from cataloging the dots and producing their associated resources that is an improvement in automated computerized systems, according to embodiments of the present disclosure.

FIG. 5 is a diagram illustrating cataloged dots and their associated produced resources resulting from cataloging the dots and producing their associated resources that is an improvement in automated computerized systems, according to embodiments of the present disclosure. The cataloged dots and their associated produced resources are shown on a map 502 corresponding to a particular domain. The cataloging of the dots and the production of their associated resources may have been performed via the method 400 of FIG. 4 and such cataloged data may be processed according to the method 300 of FIG. 3 to produce the local estimate 159 as described above with respect to FIG. 2.

In various embodiments, each dot of the plurality of dots shown in FIG. 5 represents a point in the domain defined by the border 504. For instance, dot 506 has an associated resource value 508 of 3, and the location of dot 506 within the domain and relative to other dots shown in FIG. 5 in the same domain is represented by the location of dot 506 on the map 502 within the border 504 of the domain. Information representing the cataloged dots, their associated produced resource values, the location of the dots relative to each other, the relative distances between such dots and other relevant information may be generated, stored and/or accessible by the computer system 195 of the OSP 198 and transmitted to the computer system 190 of client 193 as part of cataloged data 129. The dots are arranged in a rectangular manner, as is preferred, but other patterns are possible including, but not limited to, a hexagonal pattern, or even a random pattern. A rectangular pattern is preferred because it facilitates subsequent processing.

Figure 6:
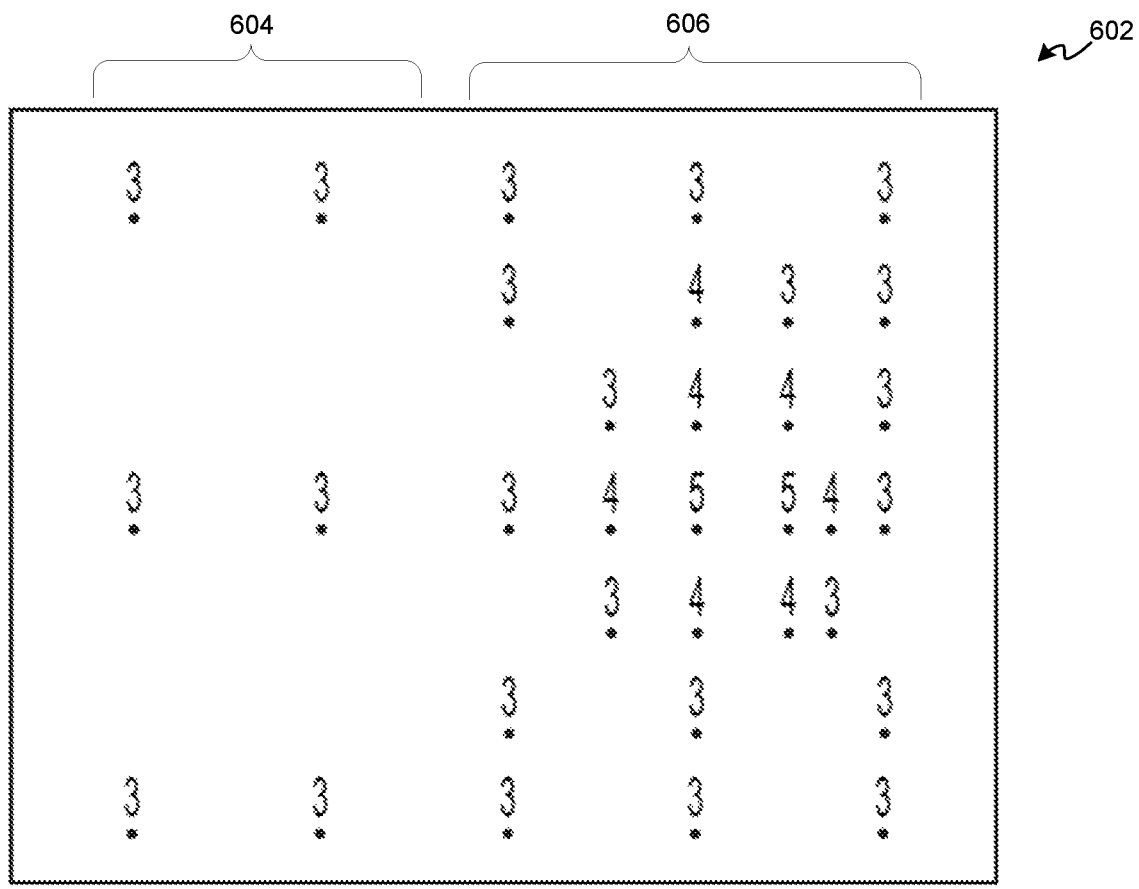
FIG. 6 is a diagram illustrating cataloged dots and their associated produced resources with non-uniform density resulting from cataloging the dots and producing their associated resources that is an improvement in automated computerized systems, according to embodiments of the present disclosure.

FIG. 6 is a diagram illustrating cataloged dots and their associated produced resources with non-uniform density resulting from cataloging the dots and producing their associated resources that is an improvement in automated computerized systems, according to embodiments of the present disclosure. The cataloged dots and their associated produced resources are shown on a map 602 corresponding to a particular domain. For example, adding additional dots and respective resources to the map 602 as described with respect to the method 400 of FIG. 4 may result in a non-uniform spatial density of dots on the map 602 as shown in FIG. 6. In particular, section 604 of the map 602 has a lower spatial density of dots than section 606 of the map 602.

Figure 7:
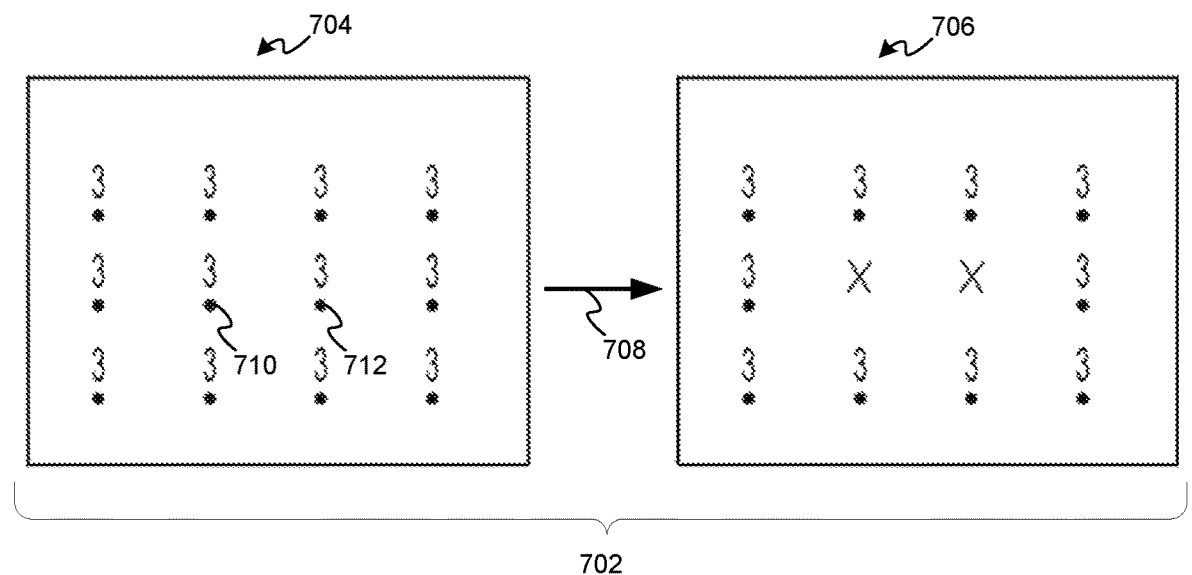
FIG. 7 is a diagram illustrating cataloged dots and their associated produced resources before and after application of a sample thinning algorithm that is an improvement in automated computerized systems, according to embodiments of the present disclosure.

FIG. 7 is a diagram illustrating cataloged dots and their associated produced resources before and after application of a sample thinning algorithm that is an improvement in automated computerized systems, according to embodiments of the present disclosure. For example, such a thinning algorithm may be used in the method 400 of FIG. 4 to remove dots and respective resources from the map 704 resulting in a non-uniform spatial density of dots as shown on the map 706.

Shown is a transformation 702 of map 704 to map 706. Map 704 shows the number and arrangement of dots before the application, represented by arrow 708, of the thinning algorithm to map 704. Map 706 shows the number and arrangement of dots after application of the thinning algorithm to map 704. The thinning algorithm operates by removing dots by at least removing one or more dots from the map 704 that are surrounded on the map 704 by other dots that have the same respective resource value as the one or more dots. In the present example, dot 710 and dot 712 are surrounded on the map 704 by other dots that have the same respective resource value of 3. Thus, according to the thinning algorithm, dot 710 and dot 712 and their respective resource values of 3 are removed from the map 704, resulting in map 706 in which the removed dots are designated by the X's shown in map 706. Since dots that are surrounded by other dots having the same resource value are also likely to have that same resource value, they may be removed from the map using the thinning algorithm to reduce the number of dots to process (and thus computational processing time and energy) in producing the local estimate for a target point on the domain associated with map 704.

Figure 8:
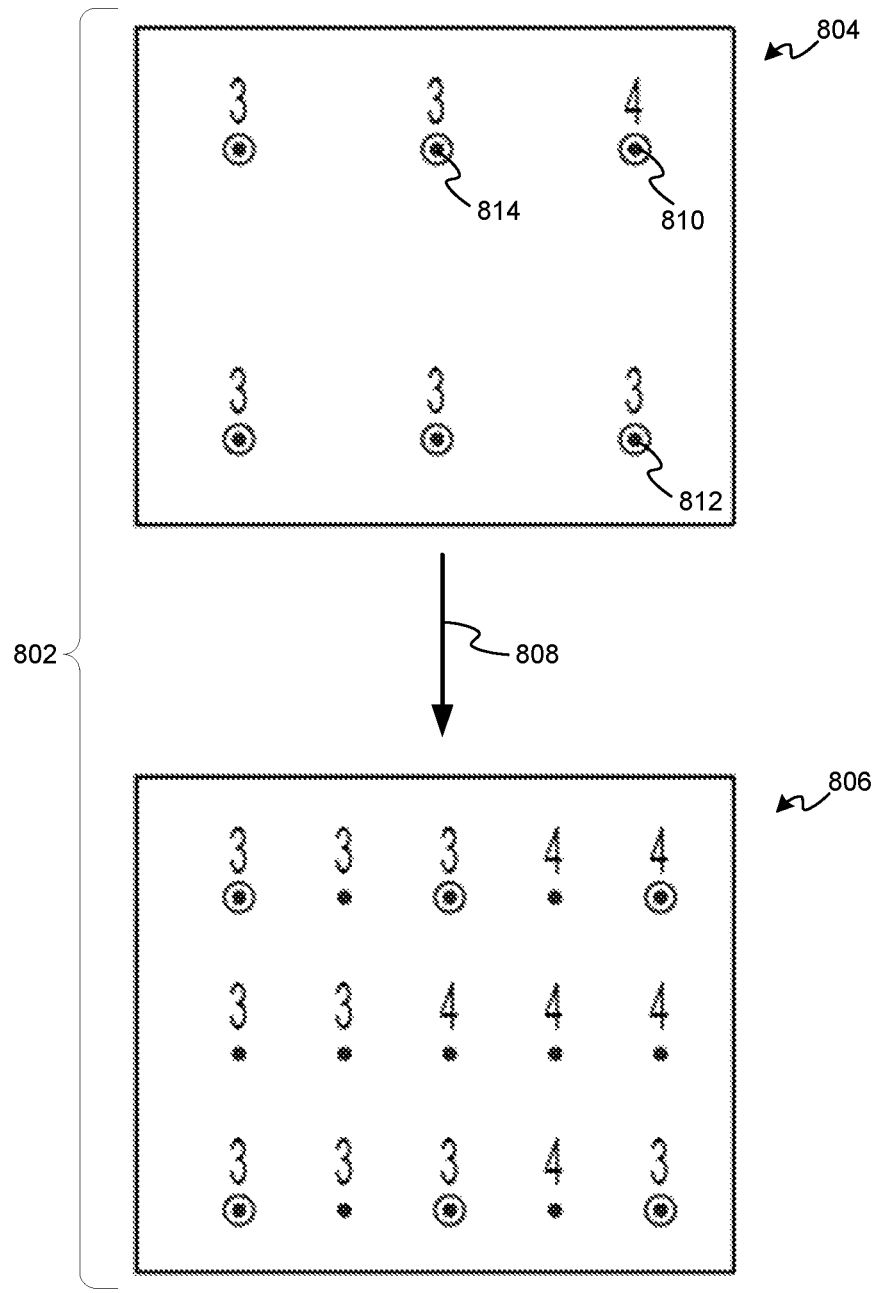
FIG. 8 is a diagram illustrating cataloged dots and their associated produced resources before and after results of a sample enriching algorithm that is an improvement in automated computerized systems, according to embodiments of the present disclosure.

FIG. 8 is a diagram illustrating cataloged dots and their associated produced resources before and after results of a sample enriching algorithm that is an improvement in automated computerized systems, according to embodiments of the present disclosure. For example, such an enriching algorithm may be used in the method 400 of FIG. 4 to add dots and respective resources to the map 804 resulting in a non-uniform spatial density of dots as shown on the map 806.

Shown is a transformation 802 of map 804 to map 806. Map 804 shows the number and arrangement of dots before the application, represented by arrow 808, of the enriching algorithm to map 804. Map 806 shows the number and arrangement of dots after application of the enriching algorithm to map 804. The enriching algorithm operates by identifying dots on the map 804 that are adjacent to each other, but have different respective resource values and then adding dots and respective resource values on the map 804 in between and also possibly surrounding the identified dots. In the present example, dot 810 has a resource value of 4, which is different than neighboring dot 812, which has a resource value of 3 and is also different than neighboring dot 814, which also which has a resource value of 3. Thus, application of the enriching algorithm adds dots and associated resource values in between and surrounding those dots within the boundary of the domain. Since dots that have neighboring dots with different resource values are likely to have additional points between them that also have different resource values, then adding such dots between them may increase the accuracy of the local estimate for a target point on the domain associated with the map 804.

Figure 9:
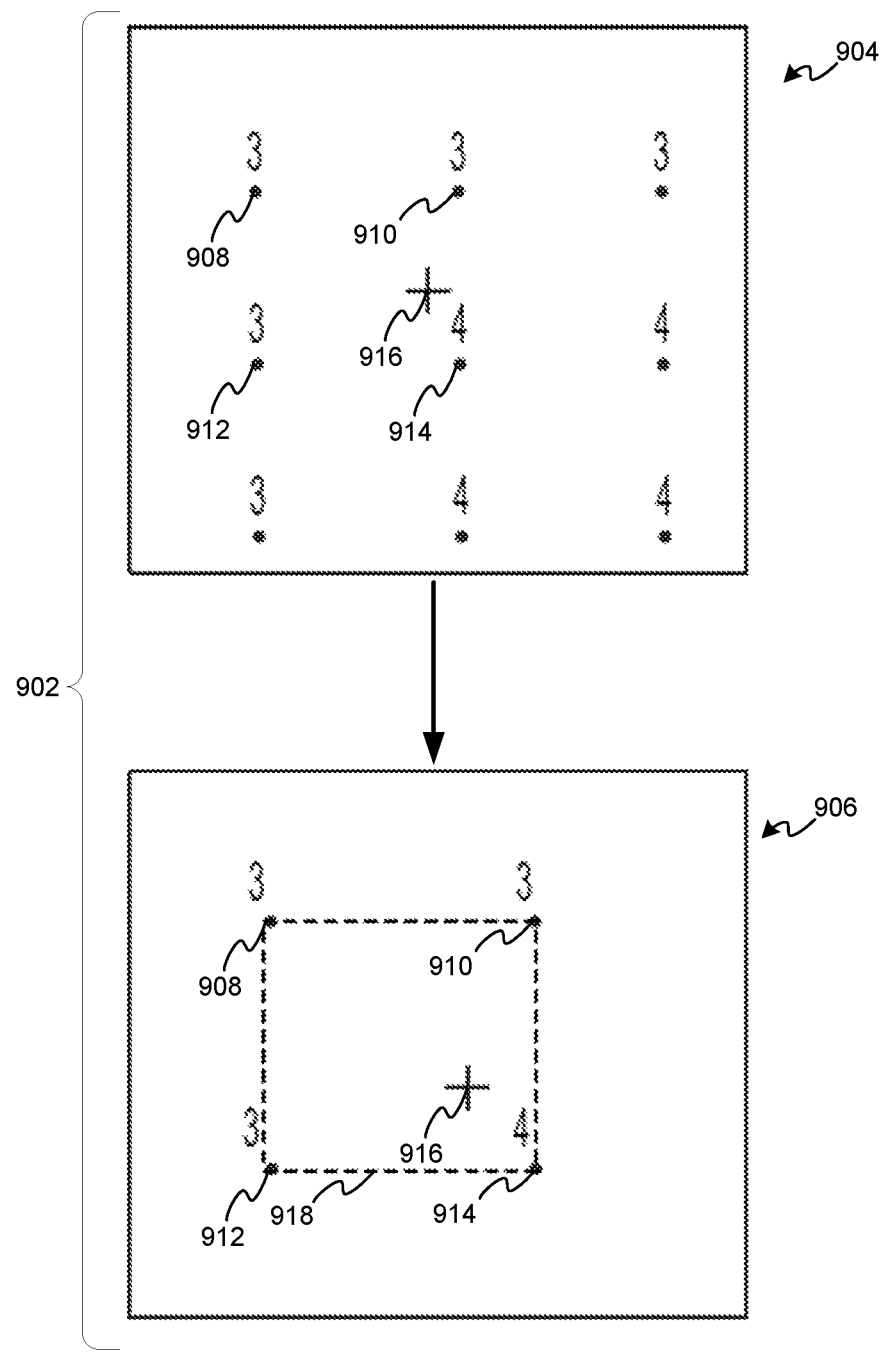
FIG. 9 is a diagram illustrating an application of a sample dot search algorithm that is an improvement in automated computerized systems, according to embodiments of the present disclosure.

FIG. 9 is a diagram illustrating an application 902 of a sample dot search algorithm that is an improvement in automated computerized systems, according to embodiments of the present disclosure. For example, such a sample dot search algorithm may be used in the method 400 of FIG. 4 in estimating a statistic for a resource for a target point in the domain based on the respective computed resource values of the closest one or more dots. After identifying the target point 916, the dot search algorithm confirms the target point 916 is in the cataloged domain represented by map 904. In response to confirming the target point 916 is in the cataloged domain, the dot search algorithm discovers a closest one or more dots to the target point 916 based on the cataloged data. For example, the distance between the target point 916 and the other dots on the map 904 may be based on the difference in coordinate values of the target point 916 and the other dots on the map 904. If the dots are in a substantially rectangular pattern, as in the present example, the algorithmic search for the closest dots to the target point 916 stops upon discovering four dots which, taken together, surround the target point 916 as indicated by the dashed line 918 in map 906 surrounding target point 916. Thus, in the present example, as shown in map 906, the dot search algorithm discovers that dot 908, dot 910, dot 912 and dot 914 are the closest four dots in map 904 to target point 916. In other embodiments, if a hexagonal pattern is used, the algorithmic search for the closest dots to the target point stops upon discovering three dots which, taken together, surround the target point.

Distances from the target point 916 to the four dots (dot 908, dot 910, dot 912 and dot 914) may be computed by comparing latitude and longitude distances. In some embodiments, the Pythagorean theorem may be used, or the distance values can be considered in ordered pairs, DX, DY. The sample aggregation algorithm may discard identified dots that are outside a threshold distance from target point 916, or outside a threshold distance from the target point 916 as compared to other dots. For example, if the distance from the target point 916 to one or two dots is smaller than to the remaining dots by a threshold, then the more distant dots may be discarded. In one example embodiment, if the closest dot to the target point 916 is 2.5 times closer than other dots, then the others can be discarded or disregarded. In the preset example, dot 908 is discarded as being outside the threshold distance. In some embodiments, this threshold distance may be adjustable by the user.

In some embodiments, the dot search algorithm may find the closest specific number of dots to the target point 916, in which the specific number may be selectable by a user. In other embodiments, the dot search algorithm may find all dots that are within a threshold distance to the target point 916, in which the threshold distance may also be selectable by a user.

Figure 10:
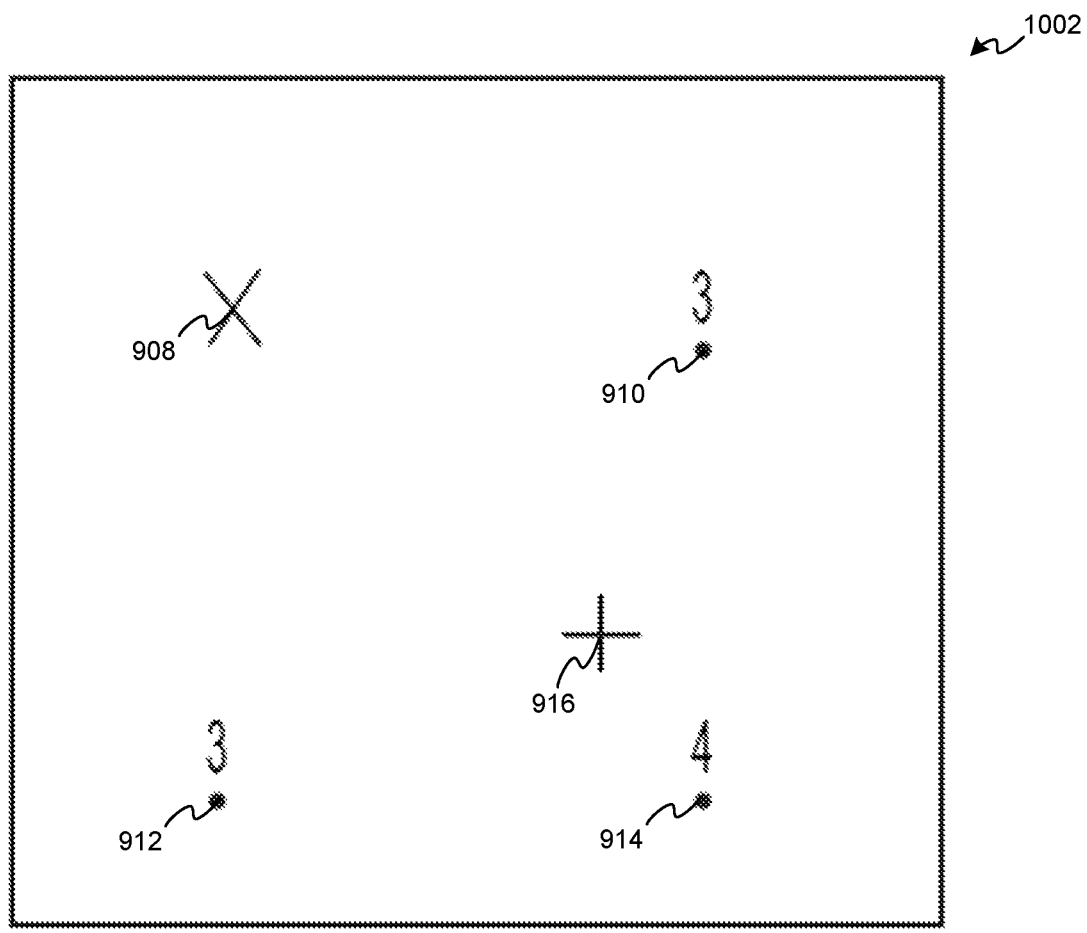
FIG. 10 is a diagram illustrating an application of a sample aggregation algorithm that is an improvement in automated computerized systems, according to embodiments of the present disclosure.

FIG. 10 is a diagram illustrating an application of a sample aggregation algorithm that is an improvement in automated computerized systems, according to embodiments of the present disclosure. In the present example, according the aggregation algorithm, the estimate of the resource value for the target point 916 may be based on the respective resource values of dot 910, dot 912 and dot 914 shown on map 1002 (as dot 908 has been discarded). For example, the estimate of the resource value for the target point 916 may be, or be based on, an average, a median, and/or a weighted average based on distance from the target point 916, of the respective resource values of dot 910, dot 912 and dot 914. In other embodiments, the estimate of the resource value for the target point 916 may be, or be based on, some other statistic based on the respective resource values and/or locations of dot 910, dot 912 and dot 914 relative to target point 916.

In some embodiments, the aggregation algorithm may select the resource value of the closest remaining dot, which in the present example is the resource value 4 of dot 914. In other embodiments, the sample aggregation algorithm may select the resource value of the remaining dot(s) on map 1002 having the smallest resource value (which in the present example is the resource value 3 shared by dot 910 and dot 912), the largest resource value (which in the present example is the resource value 4 of dot 914), the resource value, or most common resource value, of the majority of remaining closest dots (which in the present example is the resource value 3 shared by dot 910 and dot 912), or some other statistic based on selections of the remaining dots on map 1002. Such selections may be based on indications of user preferences as indicted by input from the user. The resource value selected as the result of the aggregation algorithm is then used as, or is used to calculate, the estimated resource value for the target point 916.

In other embodiments, various other techniques in spatial access methods may be used to produce a local estimate of a resource value for the target point 916. For example, in one embodiment, the computer system 190 of the client 193 builds an R-tree of all the unique combinations of domains that may be associated with the target point and then creates a list of all possible resource values for the target point based on the different combinations of rates associated with each domain.

Figure 11:
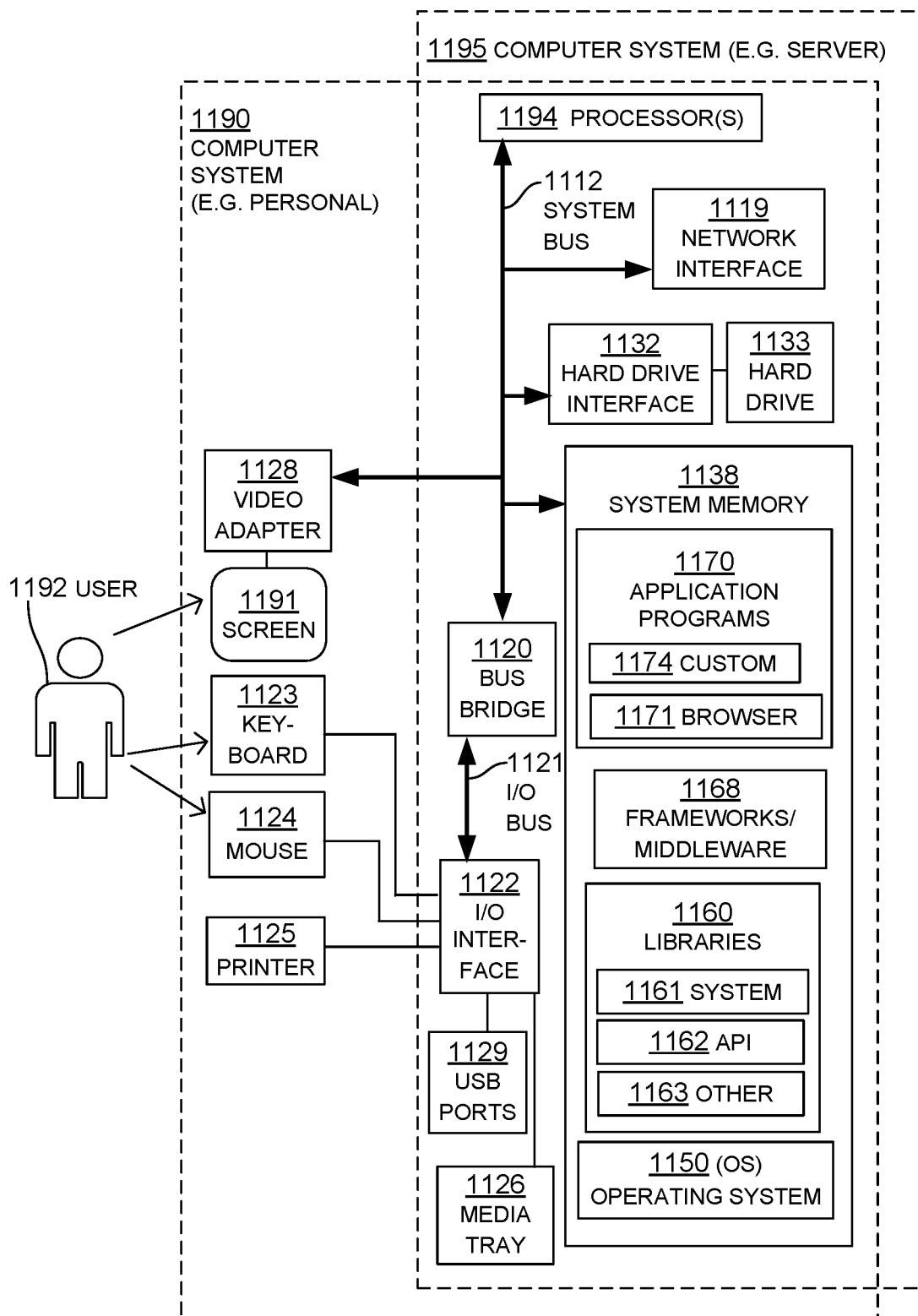
FIG. 11 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure.

FIG. 11 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure.

In the present example, FIG. 11 is a block diagram illustrating components of a sample computer system 1190 and a sample computer system 1195 according to some exemplary embodiments, which may read instructions from a machine-readable medium (e.g., a non-transitory computer-readable medium) and perform any one or more of the processes, methods, and/or functionality discussed herein. The computer system 1195 may be a server, while the computer system 1190 may be a personal device, such as a personal computer, a desktop computer, a personal computing device such as a laptop computer, a tablet computer, a mobile phone, and so on. Either type may be used for the computer system 195 and 190 of FIG. 1, a computer system that is part of secondary entity 196 and/or a computer system that is part of any entity or system shown in any of the Figures of the present disclosure.

The computer system 1195 and the computer system 1190 have similarities, which FIG. 11 exploits for purposes of economy in this document. It will be understood, however, that a component in the computer system 1195 may be implemented differently than the same component in the computer system 1190. For instance, a memory in a server may be larger than a memory in a personal computer, and so on. Similarly, custom application programs 1174 that implement embodiments may be different, and so on.

The computer system 1195 includes one or more processors 1194. The processor(s) 1194 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 1194 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 1195, or the computer system 1190, are not intended to be exhaustive. Rather, they are representative, for highlighting essential components that can be used with embodiments.

The computer system 1195 also includes a system bus 1112 that is coupled to the processor(s) 1194. The system bus 1112 can be used by the processor(s) 1194 to control and/or communicate with other components of the computer system 1195.

The computer system 1195 additionally includes a network interface 1119 that is coupled to system bus 1112. Network interface 1119 can be used to access a communications network, such as the network 188. Network interface 1119 can be implemented by a hardware network interface, such as a Network Interface Card (NIC), wireless communication components, cellular communication components, Near Field Communication (NFC) components, 5G cellular wireless interfaces, transceivers, and antennas, Bluetooth® components such as Bluetooth® Low Energy, Wi-Fi® components, etc. Of course, such a hardware network interface may have its own software, and so on.

The computer system 1195 also includes various memory components. These memory components include memory components shown separately in the computer system 1195, plus cache memory within the processor(s) 1194. Accordingly, these memory components are examples of non-transitory machine-readable media. The memory components shown separately in the computer system 1195 are variously coupled, directly or indirectly, with the processor(s) 1194. The coupling in this example is via the system bus 1112.

Instructions for performing any of the methods or functions described in this document may be stored, completely or partially, within the memory components of the computer system 1195, etc. Therefore, one or more of these non-transitory computer-readable media can be configured to store instructions which, when executed by one or more processors 1194 of a host computer system such as the computer system 1195 or the computer system 1190, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 1195 include a non-volatile hard drive 1133. The computer system 1195 further includes a hard drive interface 1132 that is coupled to the hard drive 1133 and to the system bus 1112.

The memory components of the computer system 1195 include a system memory 1138. The system memory 1138 includes volatile memory including, but not limited to, cache memory, registers and buffers. In embodiments, data from the hard drive 1133 populates registers of the volatile memory of the system memory 1138.

In some embodiments, the system memory 1138 has a software architecture that uses a stack of layers, with each layer providing a particular functionality. In this example the layers include, starting from the bottom, an Operating System (OS) 1150, libraries 1160, frameworks/middleware 1168 and application programs 1170, which are also known as applications 1170. Other software architectures may include less, more or different layers. For example, a presentation layer may also be included. For another example, some mobile or special purpose operating systems may not provide a frameworks/middleware 1168.

The OS 1150 may manage hardware resources and provide common services. The libraries 1160 provide a common infrastructure that is used by the applications 1170 and/or other components and/or layers. The libraries 1160 provide functionality that allows other software components to perform tasks more easily than if they interfaced directly with the specific underlying functionality of the OS 1150. The libraries 1160 may include system libraries 1161, such as a C standard library. The system libraries 1161 may provide functions such as memory allocation functions, string manipulation functions, mathematical functions, and the like.

In addition, the libraries 1160 may include API libraries 1162 and other libraries 1163, such as for SDKs. The API libraries 1162 may include media libraries, such as libraries to support presentation and manipulation of various media formats such as MPEG4, H.264, MP3, AAC, AMR, JPG, and PNG. The API libraries 1162 may also include graphics libraries, for instance an OpenGL framework that may be used to render 2D and 3D in a graphic content on the screen 1191. The API libraries 1162 may further include database libraries, for instance SQLite, which may support various relational database functions. The API libraries 1162 may additionally include web libraries, for instance WebKit, which may support web browsing functionality, and also libraries for applications 1170.

The frameworks/middleware 1168 may provide a higher-level common infrastructure that may be used by the applications 1170 and/or other software components/modules. For example, the frameworks/middleware 1168 may provide various Graphic User Interface (GUI) functions, high-level resource management, high-level location services, and so forth. The frameworks/middleware 1168 may provide a broad spectrum of other APIs that may be used by the applications 1170 and/or other software components/modules, some of which may be specific to the OS 1150 or to a platform.

The application programs 1170 are also known more simply as applications and apps. One such app is a browser 1171, which is a software that can permit the user 1192 to access other devices in the internet, for example while using a Graphic User Interface (GUI). The browser 1171 includes program modules and instructions that enable the computer system 1195 to exchange network messages with a network, for example using Hypertext Transfer Protocol (HTTP) messaging.

The application programs 1170 may include one or more custom applications 1174, made according to embodiments. These can be made so as to cause their host computer to perform operations according to embodiments disclosed herein. Of course, when implemented by software, operations according to embodiments disclosed herein may be implemented much faster than may be implemented by a human mind; for example, tens or hundreds of such operations may be performed per second according to embodiments, which is much faster than a human mind can do.

Other such applications 1170 may include Enterprise Resource Planning (ERP) application, accounting applications, financial applications, accounting applications, payment systems applications, database and office applications, contacts application, a word processing application, a location application, a media application, a messaging application, and so on. Applications 1170 may be developed for the Windows™ operating system, and/or by using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 1170 may use built-in functions of the OS 1150, of the libraries 460, and of the frameworks/middleware 1168 to create user interfaces for the user 1192 to interact with.

The computer system 1195 moreover includes a bus bridge 1120 coupled to the system bus 1112. The computer system 1195 furthermore includes an input/output (I/O) bus 1121 coupled to the bus bridge 1120. The computer system 1195 also includes an I/O interface 1122 coupled to the I/O bus 1121.

For being accessed, the computer system 1195 also includes one or more Universal Serial Bus (USB) ports 1129. These can be coupled to the I/O interface 1122. The computer system 1195 further includes a media tray 1126, which may include storage devices such as CD-ROM drives, multi-media interfaces, and so on.

The computer system 1190 may include many components similar to those of the computer system 1195, as seen in FIG. 11. In addition, a number of the application programs may be more suitable for the computer system 1190 than for the computer system 1195.

The computer system 1190 further includes peripheral input/output (I/O) devices for being accessed by a user 1192 more routinely. As such, the computer system 1190 includes a screen 1191 and a video adapter 1128 to drive and/or support the screen 1191. The video adapter 1128 is coupled to the system bus 1112.

The computer system 1190 also includes a keyboard 1123, mouse 1124, and a printer 1125. In this example, the keyboard 1123, the mouse 1124, and the printer 1125 are directly coupled to the I/O interface 1122. Sometimes this coupling is wireless or may be via the USB ports 1129.

In this context, "machine-readable medium" refers to a component, device or other tangible media able to store instructions and data temporarily or permanently and may include, but is not limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 1194.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all, of these aspects have even similar reference numerals.)

Referring again to FIGS. 1 and 2, as an example use case, businesses, such as client 193, may use the OSP 198 to estimate a resource (e.g., a sales tax, service tax, use tax, electronic waste recycling (eWaste) fees, etc.) on transactions with customers, such as with secondary entity 196. Such estimations may be made and transmitted before, during and/or after these transactions. Such taxes involving transactions may be referred to herein generally as transaction taxes. Such transactions with customers are examples of relationship instances with secondary entities, such as secondary entity 196, described above. The businesses may transmit information to the OSP 198 over network 188 via connector 122 in order to enable the OSP 198 to produce and transmit the tax estimates back to the businesses. This information may include, but is not limited to: data regarding the seller and recipient of the goods or services involved in the transaction; the respective locations of the seller, the recipient, and the goods and/or services; locations where the goods are delivered or where the recipient takes possession of the goods or receives the services; data about the goods and/or services being sold; and other transaction data. This data may be included in a dataset, such as dataset 135 shown in FIG. 2.

However, due to unfavorable conditions or latency of the network 188, overloading of the OSP 198 or other operating conditions or demands on the OSP 198 preventing the OSP 198 from producing the estimates in a timely manner, a rough, locally generated tax estimate (e.g., LE 159) based on a coarse values file (e.g., CVF 128) and cataloged data (e.g., cataloged data 129) that was previously received from the OSP 198 may be able to be produced and received by the client computing system 190 more efficiently or faster than a more accurate tax estimate produced by the service engine 183 of the OSP 198. This may be important especially when ales tax estimates are needed in real time as transaction are occurring. For example, CVF 128 and/or cataloged data 129 may have tax rates according to zip codes, plus one or more special variables. Still, it may be that this information is not complete or fully accurate, and thus would only provide approximate estimates because it does not discuss or consult other tax-related parameters, such as, for example, individual product taxability (e.g., clothing, alcohol, etc.), tax holidays and, in any event, tax boundaries which do not necessarily follow the zip codes that the CVF 128 and/or cataloged data 129 is based on. Also, although the CVF 128 and/or cataloged data 129 may not include all the parameters and values needed to provide a fully accurate tax estimate, reducing the data package size of the CVF 128 and/or cataloged data 129 makes it more efficiently and easily deployable to the client computer system 190 via network 188. The present use case deals with providing a more efficient and accurate way of calculating an estimate for transaction taxes for a given transaction when tax boundaries do not necessarily follow the zip code associated with the transaction.

FIG. 12 is a sample view of a User Interface (UI) 1204 of a system for estimating resources that provides a selectable option to produce a local estimate of a tax amount based on a selection from a range of possible techniques to estimate the tax amount for a given transaction and associated zip code that is an improvement in automated computerized systems, according to embodiments of the present disclosure.

For example, the UI 1204 may be presented by the CCF 126 of the computer system 190 and the screen 1202 on which the UI 1204 is presented may be the screen 191 of the computer system 190. The selectable option may be to produce the LE 159 of FIG. 2 of a tax based on a selection of, for a given transaction and associated zip code, a maximum possible tax, a minimum possible tax, a median tax amount, an average tax amount and/or an exact estimated tax amount, for example using the method 400 of FIG. 4 to produce the local estimate based on an estimated statistic regarding the zip code. The computer system 190 may receive input indicating the selection. In the present example, the user has selected the LE 159 include the maximum possible tax for the transaction and the median tax amount based on all or a selected group of previous cataloged transactions over a specific time period in the cataloged zip code that overlays various different tax jurisdictions.

Figure 13:
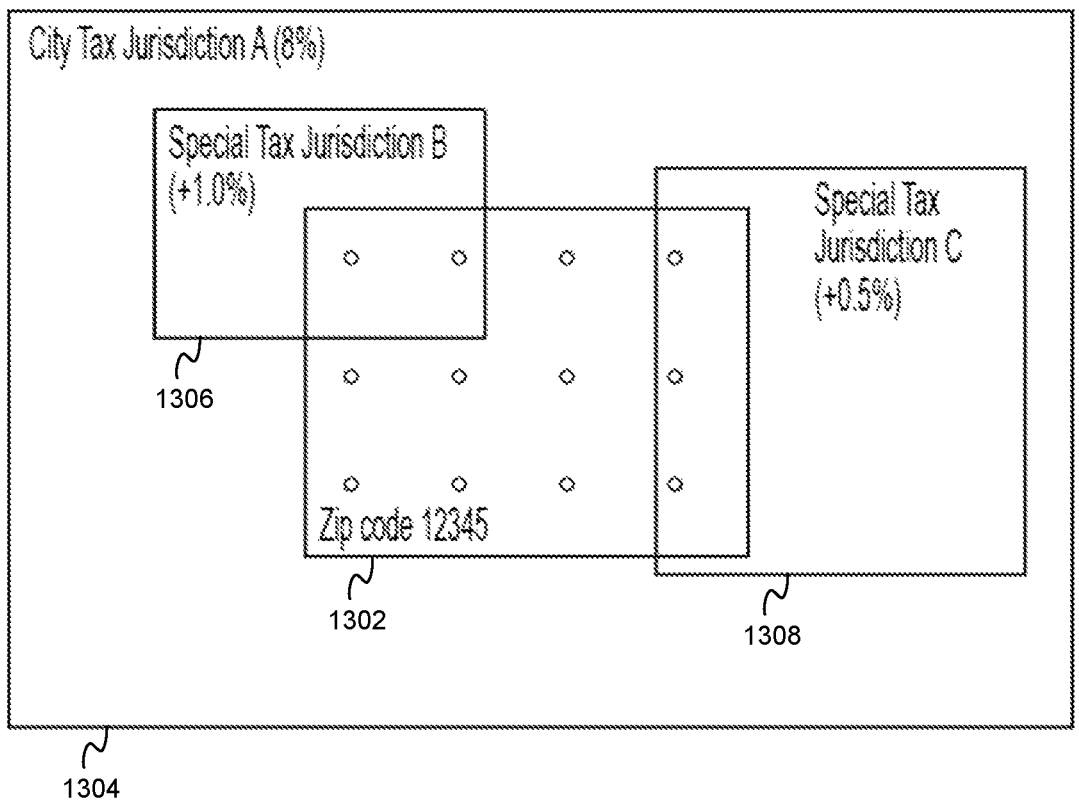
FIG. 13 is a diagram illustrating how a zip code overlays various different tax jurisdictions and how different dots representing different geographic points within the zip code may fall within different combinations of those tax jurisdictions, according to embodiments of the present disclosure.

FIG. 13 is a diagram illustrating how a zip code overlays various different tax jurisdictions and how different dots representing different geographic points within the zip code may fall within different combinations of those tax jurisdictions, according to embodiments of the present disclosure.

Shown is example zip code 12345 1302 that overlays city tax jurisdiction A 1304, special tax jurisdiction B 1306 and special tax jurisdiction C 1308. Note that while all of zip code 12345 1302 falls within city tax jurisdiction A 1304, only a part of zip code 12345 1302 overlays special tax jurisdiction B 1306 and a different part of zip code 12345 1302 overlays special tax jurisdiction C 1308. Thus, transactions associated geographical points within zip code 12345 1302 represented by dots within special tax jurisdiction B 1306 are subject to the special tax jurisdiction B 1306 transaction tax of 1.0% and are also subject to the city tax jurisdiction A 1304 transaction tax of 8%, while transactions associated geographical points within zip code 12345 1302 represented by dots within special tax jurisdiction C 1308 are subject to the special tax jurisdiction C 1308 transaction tax of 0.5% and are also subject to the city tax jurisdiction A 1304 transaction tax of 8%. However, transactions associated geographical points within zip code 12345 1302 represented by dots that do not fall within either special tax jurisdiction B 1306 or special tax jurisdiction C 1308 are only subject to the city tax jurisdiction A 1304 of 8%. Rather than having to determine which tax jurisdictions each transaction associated with a particular location in a zip code dot falls within, the CCF 126 of the computer system 190 may use the cataloged data 129 including the cataloged zip code associated with the transaction to locally perform estimation of the resource (e.g., tax amount due) for the relationship instance (e.g., transaction) associated with the particular domain (e.g., zip code). This increases efficiency and saves computing resources by avoiding making computer network calls, such API calls to OSP 198 to access the most detailed and updated digital rules and compute the most accurate tax amount due. This also reduces internet traffic and it can be critical when the internet is down or slow, and the results of the computations are needed in real time.

For example zip code 12345 1302 is first cataloged by the OSP 198 by selecting a plurality of dots within zip code 12345 1302 as shown in FIG. 13, in which each dot of the plurality of dots represents a point spatially (e.g., geographically) within zip code 12345 1302. The OSP 198 then accesses digital rules regarding computing transaction taxes for zip code 12345 1302. For example, these digital rules may indicate the tax rates of the various tax jurisdictions that zip code 12345 1302 overlays, including the tax rate of city tax jurisdiction A 1304 (8%), the tax rate of special tax jurisdiction B 1306 (1.0%) and the tax rate of special tax jurisdiction C 1308 (0.5%). Based on the accessed digital rules, for each dot of the plurality of dots, the OSP 198 then produces a respective transaction tax amount (or tax rate) that would be due for a transaction associated with the specific location within zip code 12345 1302 represented by the dot. The OSP 198 then generates a map of dots, as shown in FIG. 13, located spatially within zip code 12345 1302 based on respective geographic positions of each dot relative to each other within zip code 12345 1302. In some embodiments, the OSP 198 performs either removing dots and the respective produced transaction tax amounts from the map of zip code 12345 1302 or adds additional dots and respective transaction tax amounts to the map of zip code 12345 1302, resulting in a non-uniform spatial density of dots on the map of zip code 12345 1302. The OSP 198 then transmits the cataloged data of cataloged zip code 12345 1302 to client 193, thereby enabling the client 193 to produce a local estimate of transaction tax for a dataset that represents a given transaction associated with a specific target location within zip code 12345 1302.

FIG. 14 is a sample view of a User Interface (UI) 1404 of a system for estimating resources that provides output including local estimates of a tax amount for a given transaction and associated zip code based on the selection made via the UI 1204 of FIG. 12 that is an improvement in automated computerized systems, according to embodiments of the present disclosure.

For example, the UI 1404 may be presented by the CCF 126 of the computer system 190 and the screen 1402 on which the UI 1404 is presented may be the screen 191 of the computer system 190. In the present example, the CCF 126 of the client 193 produces a local estimate of transaction tax for a dataset that represents a given transaction associated with a specific target location within zip code 12345 1302 based on the cataloged data of cataloged zip code 12345 1302 and according to the selections made by the user via UI 1204 in FIG. 12. The user has selected for the CCF 126 to produce the maximum possible tax and a median tax amount for a given transaction. However, such selections may be made for and applied to all transactions, a selected group or selected types of transactions associated with the client 193 until the user changes the selections via UI 1204. For example, the maximum possible tax may be, or be based on, as found within the cataloged data of zip code 12345 1302, the maximum tax amount or maximum tax rate of all the dots representing different geographic points within zip code 12345 1302 based on the different combinations of tax jurisdictions they fall within. The median tax amount may be, or be based on, the median tax amount or median tax rate of all the dots, or of the closest dots to a target point in zip code 12345 1302 associated with the transaction as determined by the method 300 based on the cataloged data of zip code 12345 1302. The maximum possible tax for the transaction is displayed in UI 1404 as "maximum possible tax=a" and the median tax amount is displayed in UI 1404 as "median tax amount=b". However, such output may be displayed with other estimated transaction tax amounts and/or data regarding other transactions of the client 193 associate with zip code 12345 1302 or other domains.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to stored data and other system components described herein may be available by mechanisms such as through C, C++, C#, and Java APIs;

libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

U.S. patent application Ser. No. 17/127,205, filed Dec. 18, 2020 and entitled COARSE VALUES FOR ESTIMATING LESS-THAN-CRITICAL RESOURCES is hereby incorporated by reference in its entirety.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer system of a client entity that is configured to cooperate with an online service platform (OSP), the computer system including at least:
one or more processors;
a local output device; and
a non-transitory computer-readable storage medium having stored thereon instructions which, when executed by the one or more processors, result in operations including at least:
storing locally on the non-transitory computer-readable storage medium a client computing facility (CCF) that includes digital rules;
receiving, from the OSP across a network, a coarse values file (CVF) that includes values;
generating a dataset that represents a relationship instance of the client entity with another entity;
producing, by the digital rules of the CCF and the values of the CVF, a local estimate of a resource for the dataset, in which the producing the local estimate includes at least:
receiving cataloged data of a cataloged domain, the cataloged data including data representing a plurality of dots and a respective computed resource value for each of the plurality of dots, in which each dot of the plurality of dots represents a point in the cataloged domain;
identifying a target point from the dataset;
confirming the target point is in the cataloged domain;
in response to confirming the target point is in the cataloged domain, discovering a closest one or more dots to the target point based on the cataloged data;
estimating a statistic for a resource for the target point based on the respective computed resource values of the closest one or more dots;
storing the estimated statistic in a memory; and
producing the local estimate based on the estimated statistic; and
outputting the local estimate to the local output device in conjunction with the dataset.

2. The computer system of claim 1 in which the estimated statistic is a single estimated resource value.

3. The computer system of claim 1 in which:
the estimated statistic includes a maximum resource value and a minimum resource value of the respective computed resource values of the closest one or more dots; and
the producing the local estimate includes:
receiving input indicating a selection of what percent of the maximum resource value and what percent of the minimum resource value to use in producing the local estimate; and
producing the local estimate based on the selection.

4. The computer system of claim 1 in which a location of the target point is defined within the cataloged domain by coordinates.

5. The computer system of claim 1 in which the cataloged domain is a geographical area and each dot of the plurality of dots represents a location within the geographical area.

6. The computer system of claim 1 in which the CVF includes the cataloged data.

* * * * *